United States Patent [19]

Weber

[11] Patent Number: 5,080,636

[45] Date of Patent: Jan. 14, 1992

[54] INTERMITTENT MOTION DRIVE ASSEMBLY

[76] Inventor: Theodore Weber, 45 Tweed Blvd., Nyack, N.Y. 10960

[21] Appl. No.: 644,954

[22] Filed: Jan. 22, 1991

[51] Int. Cl.⁵ .............................................. F16H 3/74
[52] U.S. Cl. ........................................ 475/14; 475/17; 475/904
[58] Field of Search .................. 475/14, 17, 331, 904; 74/393

[56] References Cited

U.S. PATENT DOCUMENTS

| | | | |
|---|---|---|---|
| 1,858,763 | 8/1930 | Chase | 475/17 |
| 2,296,892 | 9/1942 | Andrew | 475/17 |
| 3,529,985 | 9/1970 | Köfferlein | 475/14 |
| 3,658,001 | 4/1972 | Seybold | 475/14 X |
| 3,726,150 | 4/1973 | Ikeda | 475/14 X |
| 3,730,014 | 5/1973 | Brems | 475/14 |
| 4,429,595 | 2/1984 | Butterfield | 475/904 X |
| 4,679,465 | 7/1987 | Goto et al. | 475/904 X |
| 4,864,893 | 9/1989 | Hori | 475/904 X |
| 4,944,718 | 7/1990 | Takahara et al. | 475/904 X |

Primary Examiner—Leslie A. Braun
Assistant Examiner—Daniel Wittels
Attorney, Agent, or Firm—Brooks Haidt Haffner & Delahunty

[57] ABSTRACT

A cylindrical member driven by a planetary gear arrangement traverses an epitrochoid path to periodically enter a radial slot in an arm or disc rotating the arm of disc through 180°. By selecting the parameters appropriately the cylindrical member is caused to enter and leave the radial slot along a tangential path such that no first or second derivative discontinuities are present in the motion of the arm or disc. Several embodiments are disclosed for achieving either one or two incremental rotations of an output shaft for a single revolution of an input shaft.

4 Claims, 5 Drawing Sheets

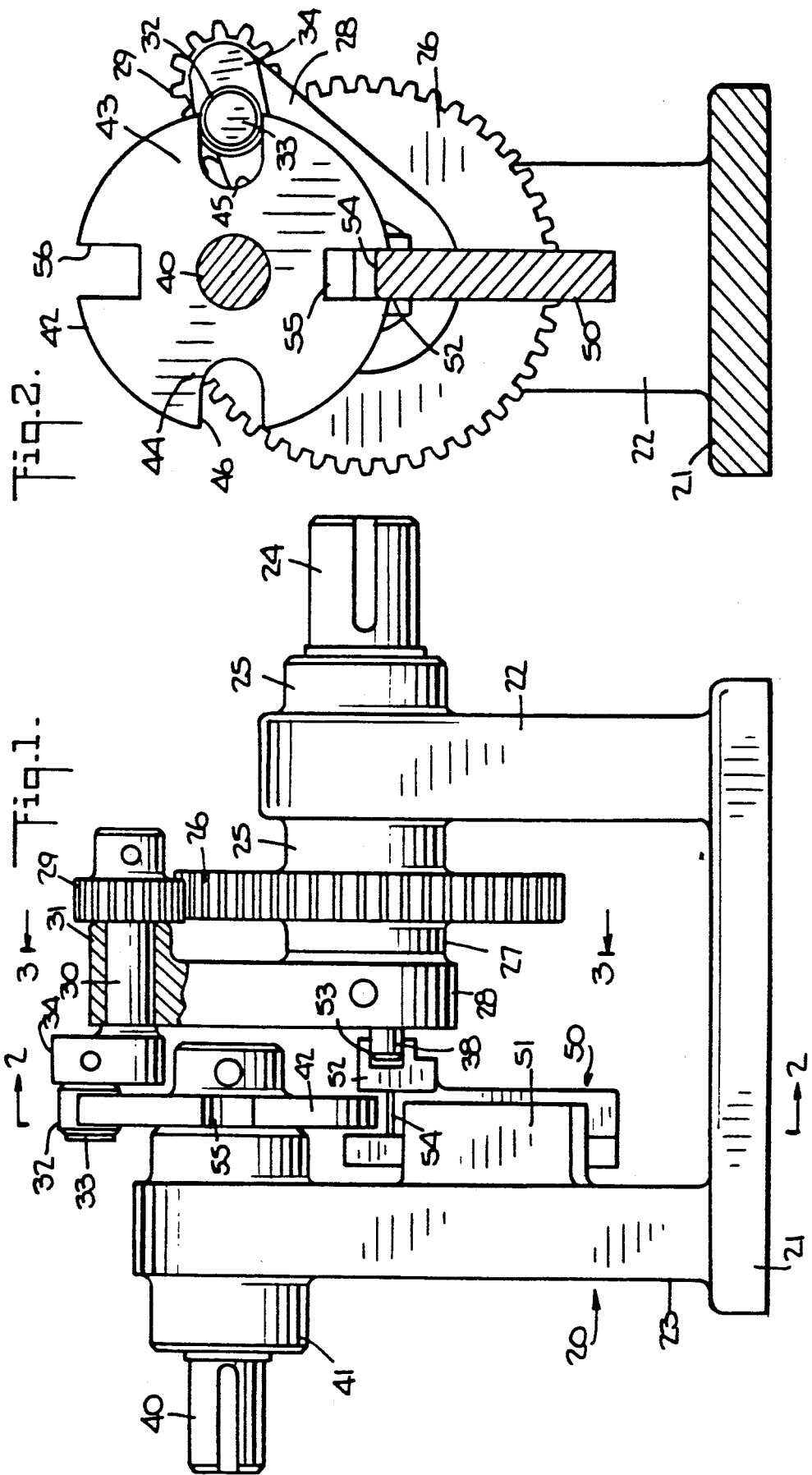

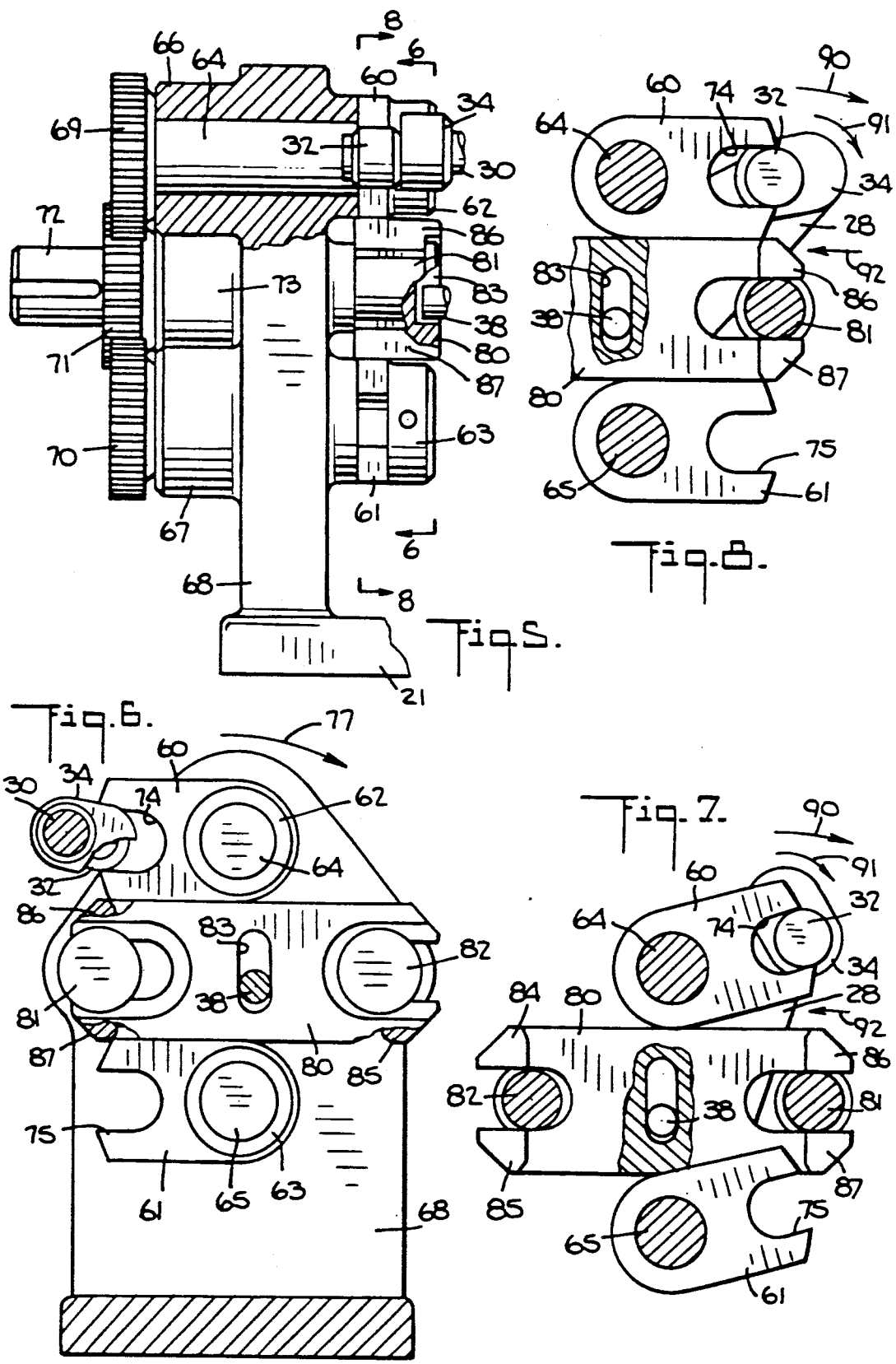

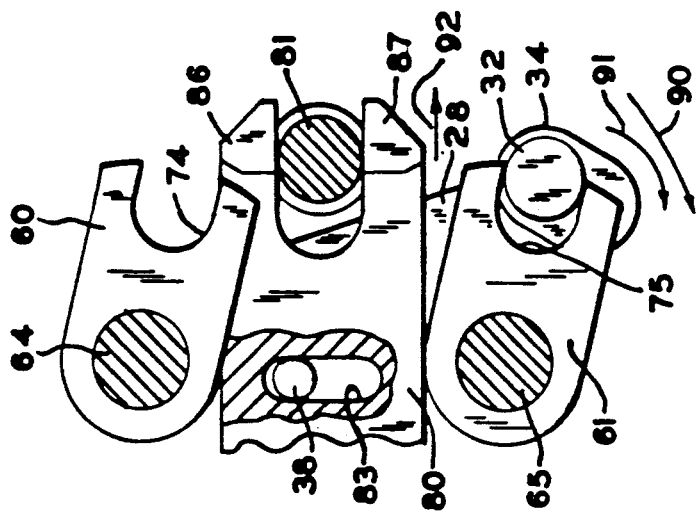
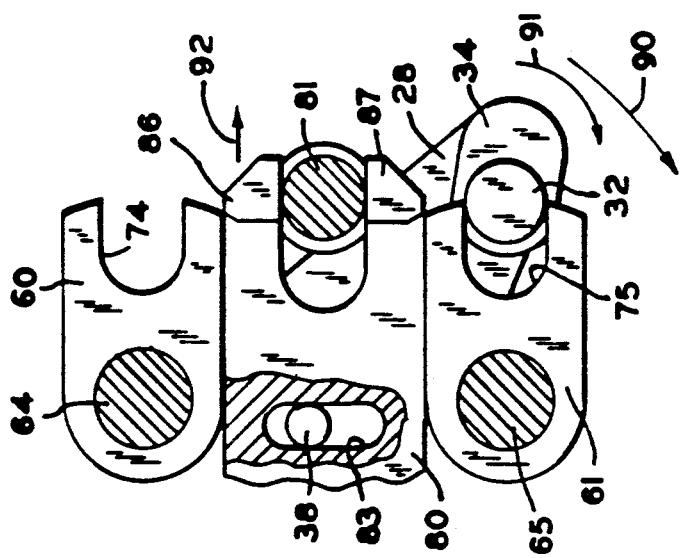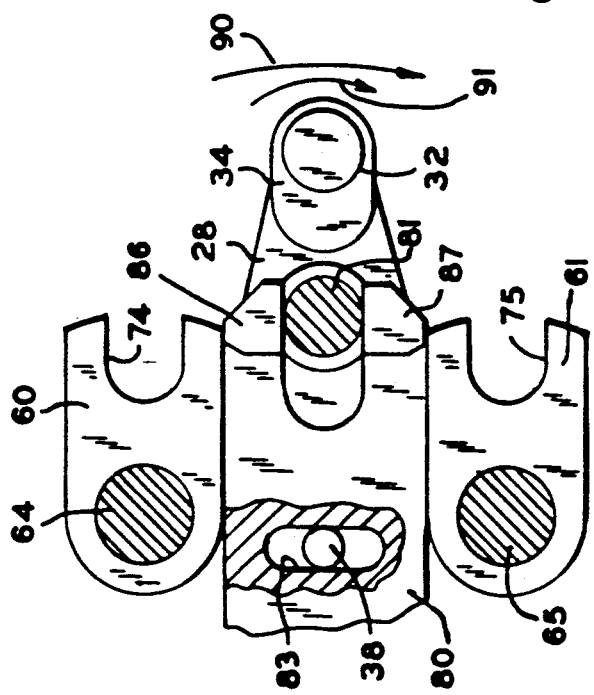

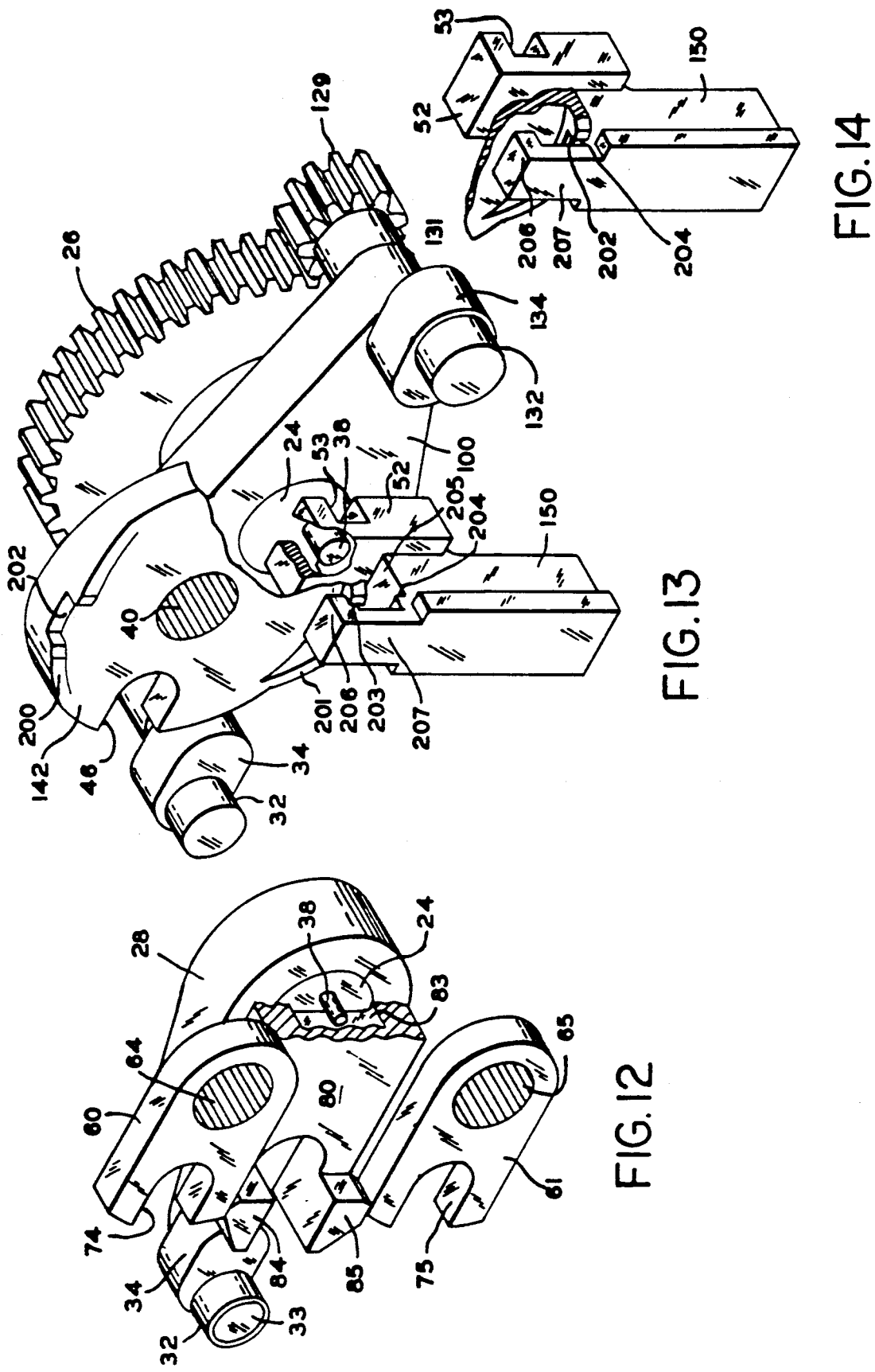

5,080,636

INTERMITTENT MOTION DRIVE ASSEMBLY

BACKGROUND OF THE INVENTION

The present invention relates to an intermittent motion drive assembly for converting continuous rotary motion of an input drive member to intermittent rotary output motion of an output member.

Motion converting drive assemblies are well known and have been produced with varying degrees of complexity using cams, gears, levers and the like. For use in driving webs for transporting articles from point to point, for example, there is a need for an intermittent drive assembly that is free from first and second derivative discontinuities whereby smooth acceleration and deceleration is obtained from and to zero velocity movement. As far as is known, no simple drive assembly is known which is capable of the desired performance.

SUMMARY OF THE PRESENT INVENTION

It is, therefore, an object of the present invention to provide a device for converting continuous constant velocity rotary motion of an input drive member to intermittent rotary output motion of an output member where the output motion is free of first and second derivative discontinuities.

Another object of the present invention is to provide such device in a relatively simple and economic form.

In accordance with one aspect of the present invention there is provided an intermittent motion drive assembly for converting continuous constant velocity rotary motion of an input drive member to intermittent rotary output motion of an output member where said output motion is free of first and second derivative discontinuities for constant velocity of said input drive member, said drive assembly comprising in combination an input drive shaft having a longitudinal axis, a stationary sun gear having a first pitch diameter and mounted concentric with said drive shaft axis, at least one planetary gear having a second pitch diameter, the ratio of said first to second pitch diameters being equal to N where N is a whole number greater than three, a radially extending arm joined to said input drive shaft for driven rotation therewith, said planetary gear being rotatably mounted on said arm about a central axis located at a radial distance a from said drive shaft axis and with the teeth of said planetary gear in toothed engagement with said sun gear for rotation thereabout, a cylindrical member coupled in driven relation to said planetary gear with the longitudinal axis of said cylindrical member disposed parallel to said drive shaft axis and offset by a radial distance b from the axis of rotation of said planetary gear, said axis of said cylindrical member traversing an epitrochoid path of N lobes centered about said drive shaft axis as said cylindrical member is driven by said planetary gear as the latter is driven about said sun gear, said epitrochoid path having alternating convex and concave sections joined by points of inflection, an output member, means operatively coupled to said output member for driving said output member, said means having two body portions each supported for rotation about a center located midway between along a straight line joining two of said points of inflection which two points of inflection mark the boundary of a contiguous sequence of concave section, inflection point, convex section, inflection point, and concave section of said epitrochoid path, each of said body portions having a radial slot open at its radially outward end and disposed at a distance from the center of the rotation of the corresponding body portion such as to be engageable by said cylindrical member for rotating said body portion and thereby said output member during the travel of said cylindrical member between said two inflection points which mark the boundaries of said contiguous sequence of sections, the relationship between said N, a and b parameters being defined by the equations $$\tan T = \frac{\tan((N+1)T)}{N+1} \text{ and} \qquad (1)$$

$$\frac{b}{a} = \frac{-\sin T}{(N+1)\sin((N+1)T)}, \text{ and} \qquad (2)$$

a detent means is coupled in driven relation to said input drive member for securing said body portions against rotation during the intervals in which said cylindrical member is out of engagement with a body portion.

BRIEF DESCRIPTION OF THE DRAWINGS

The invention will be understood better after reading the following detailed description of the presently preferred embodiments with reference to the appended drawings in which:

FIG. 1 is a front elevational view of one embodiment of the invention showing the cylindrical member engaging a body portion within its radial slot at a point midway along the epitrochoid path between the inflection points marking the boundaries of the contiguous sequence of active drive motion;

FIG. 2 is a transverse sectional view taken along line 2—2 in FIG. 1, but with the parts rotated from the midway point of FIG. 1 to the point of inflection of the epitrochoid path where the cylindrical member is about to leave the radial slot in the body portion;

FIG. 5 is a front elevational view of the output portion of another embodiment of the invention, the input portion being the same as that shown in FIG. 1;

FIG. 6 is transverse sectional view taken along the line 6—6 in FIG. 5;

FIGS. 7 to 11 are fragmentary transverse sectional views taken along the line 8—8 in FIG. 5, showing the drive assembly in different stages of operation;

FIG. 12 is a fragmentary perspective view of the parts seen in the direction of the arrows 8—8 in FIG. 5, illustrating the relationship between the detent means and the body portions for driving the output member;

FIG. 13 is a fragmentary perspective view illustrating a further modification of the embodiment of FIG. 1 in which two planetary gears are mounted at opposite ends of a common lever arm; and FIG. 14 is a fragmentary view of a portion of FIG. 13 showing a detail in the detent means.

DETAILED DESCRIPTION OF THE PRESENTLY PREFERRED EMBODIMENTS

Figure 3:
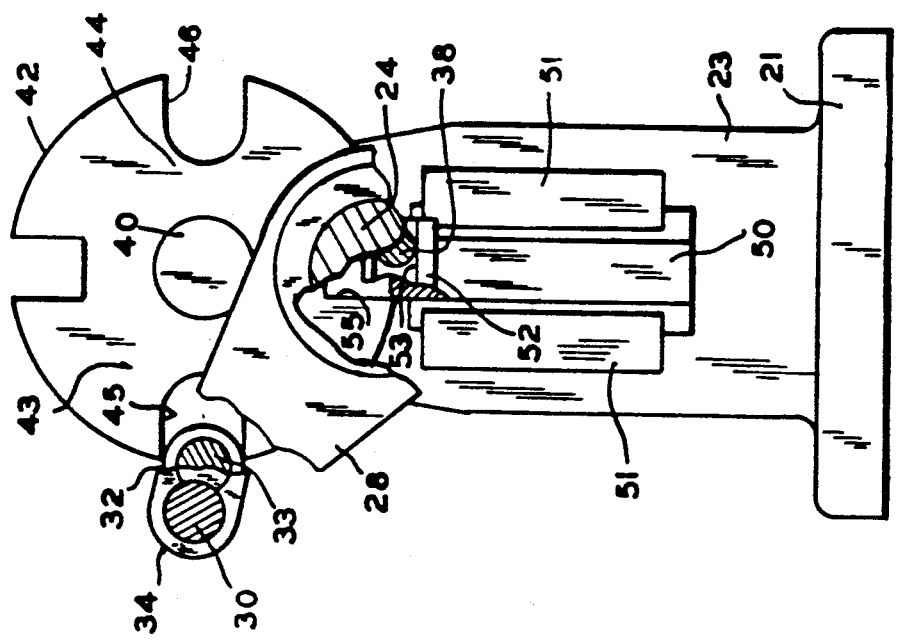
FIG. 3 is a transverse sectional view taken along line 3—3 in FIG. 1, with parts broken away for clarity and with the mechanism in the same relative position as in FIG. 2, details of the detent means being shown.

Referring, now, to FIGS. 1 to 3, there is shown a first embodiment of the intermittent motion drive assembly constructed in accordance with the present invention. A frame, designated generally by the reference numeral 20, and consisting of a base plate 21 supporting two upright standards, 22 and 23, supports the various elements of the drive assembly. An input drive member in the form of an input drive shaft 24 is journalled through a hub 25 near the upper end of standard 22. A stationary sun gear 26 is supported by the hub section 27 concentric with the longitudinal axis of the drive shaft 24. A radially extending arm 28 is joined to the left end, as seen in FIG. 1, of drive shaft 24 for driven rotation with shaft 24. A planetary gear 29 is mounted on a shaft 30 which is journalled for rotation in a hub 31 located on the arm 28 at a radial distance a from the longitudinal axis of the drive shaft 24, see FIG. 4. The pitch diameters of the sun gear 26 and planetary gear 29 are chosen such that the planetary gear meshes with the sun gear. At the same time the ratio of the respective pitch diameters, designated herein as N, is selected equal to a whole number greater than three. The reasons for such selection will be explained more fully below.

A cylindrical member, here a roller 32, is mounted for rotation concentrically about a shaft 33 which is carried, in turn, near the end of another radial arm 34 which is mounted on the opposite end of shaft 30 from planetary gear 29. The cylindrical member 32 is, therefore, coupled in driven relation to the planetary gear 29 with the longitudinal axis of member 32 disposed parallel to the axis of drive shaft 24 and offset by a radial distance b, see FIG. 4, from the axis of rotation of the planetary gear 29.

Figure 4:
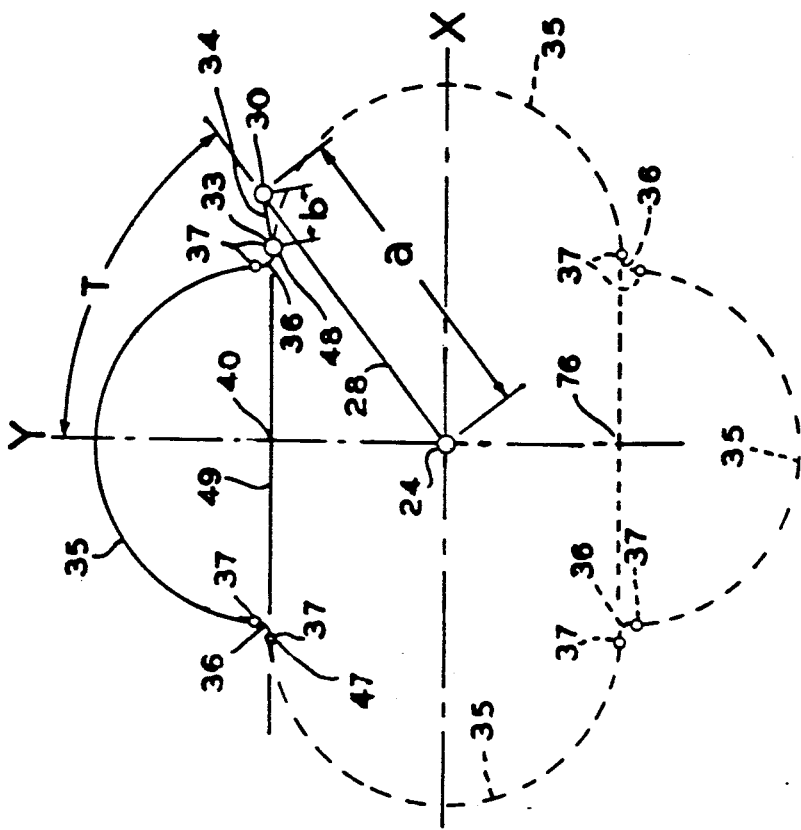
FIG. 4 is a kinematic diagram of the epitrochoid motion of the cylindrical member in the embodiment of FIGS. 1 to 3, the solid line representing the active portion while the inactive portions are shown in broken line, the points of inflection between convex and concave sections being represented by small circles, the relevant elements being shown in the same position as in FIGS. 2 and 3, and various parameters being defined.

The portion of the drive assembly described so far represents the input section of the assembly. In operation, when the drive shaft 24 is rotated, the arm 28 rotates along with shaft 24 transporting planetary gear 29 about the sun gear 26. It should be apparent that the longitudinal axis of the cylindrical member 32 will traverse an epitrochoid path, assuming that dimension b is not equal to the pitch diameter of planetary gear 29 in which case the path will be epicycloid. The epitrochoid path will have N lobes centered about the axis of drive shaft 24 where N is as defined above. Referring to FIG. 4 it will be seen that the epitrochoid path has alternating convex, 35, and concave, 36, sections joined by points of inflection, 37.

The input section has one further component in the form of a detent drive pin or finger 38, projecting longitudinally from the end of drive shaft 24. The finger 38 is eccentrically located relative to the axis of shaft 24 by an appropriate amount to perform the function that will be described below.

For the output section of the drive assembly there is provided an output member in the form of a shaft 40 journalled for rotation in a hub 41 at the upper end of standard 23. In this embodiment a disc 42 is mounted on the righthand end of shaft 40 for driving the latter. The disc may be thought of as having two body portions, 43 and 44, integrally joined and supported for rotation about a center, here the center of shaft 40. Each body portion, 43 and 44, defines a radial slot, 45 and 46, respectively, open at its radially outward end. The location of the center of shaft 40 and disc 42 is somewhat critical to a proper operation of the assembly and will be further described below. The radial slots 45 and 46 are disposed at a distance from the center of rotation of the corresponding body portion 43 and 44, here the center of shaft 40, such that the respective slots 45 and 46 are engageable by the cylindrical member 32 for rotating the body portion and thereby the output member shaft 40 during the travel of the cylindrical member between the two inflection points 47 and 48 shown in FIG. 4. The inflection points 47 and 48 mark the boundaries of a contiguous sequence of convex and concave sections shown in solid line in FIG. 4.

Referring to FIG. 4, the various significant parameters are illustrated therein. The values for the parameters a, b and T are determined by the equations $$\tan T = \frac{\tan((N+1)T)}{N+1} \quad (1)$$

and $$\frac{b}{a} = \frac{-\sin T}{(N+1)\sin((N+1)T)}. \quad (2)$$

An epitrochoid path satisfying the above equations will be characterized in that a straight line drawn between inflection points 47 and 48 will be tangent to the path at such inflection points. If such straight line is represented in FIG. 4 by the line 49, the center of shaft 40 should be located at the midpoint of that line, as shown. For proper operation, the slots 45 and 46 are located 180° apart with the radius of disc 42 chosen such that slots 45 and 46 each terminate at the point of tangency with the roller 32 when the roller 32 is at transition point 47 or 48. The depth of each of the slots 45 and 46 is selected such that the roller 32 never reaches the bottom of either slot.

If the foregoing equations (1) and (2) are satisfied, there will be no first or second derivative discontinuities in the motion of shaft 40 at the initial and final points of the traversal of the active sections of the epitrochoid. Equation 1 can be solved for T by successive approximations. If, for example, N=4, T becomes=0.91174 radians or 52.2387°. The ratio b/a becomes 0.160, and the cartesian coordinates of points 47 and 48 relative to the center 24 as the origin are given by the following equations:

$$X = \pm(a \sin T + b \sin((N+1)T)) \quad (3)$$

and $$Y = a \cos T + B \cos((N+1)T) \quad (4).$$

For a gear ratio of N=4, X=±0.6325a, and Y=0.5878a.

As mentioned above, the tangents to the epitrochoid at points 47 and 48 are perpendicular (normal) to the "Y" axis in FIG. 4, that is, normal to the axis of symmetry of the active section. Since the motion of roller 32 at points 47 and 48 is truly radial relative to disc 42, the disc 42 at that instant has zero angular velocity. If the cylindrical member 32 is at inflection point 47 commencing to enter a slot in one of the body portions 43 and 44, the member 32 will initiate movement of disc 42 from a standstill or zero velocity smoothly up to a maximum velocity and then down toward zero velocity when member 32 reaches inflection point 48. The changes in both velocity and acceleration occur smoothly free from either first or second derivative discontinuities.

It should be apparent that while the cylindrical member 32 is traversing the inactive sections of the epitrochoid path, the disc 42, and consequently the output shaft 40, is free to move unless restrained by some other means. For this purpose there is provided a detent mechanism consisting of latch 50 in the form of a T-bar riding in ways 51, and having a crosshead portion 52 provided with a cross slot 53 into which projects drive pin 38. The upper end 54 of the T-bar web is arranged to enter one or the other of two notches, 55 and 56, provided in the periphery of disc 42, and 46. The eccentricity of pin 38 relative to the longitudinal axis of shaft 24 is selected to time the movement of latch 50 so that it enters notch 55 or 56 at the very moment that cylindrical member 32 is leaving one of the slots 45 and 46. Conversely, the latch 50 leaves an engaged notch 55 or 56 at the instant that member 32 is entering a slot 45 or 46.

If T is expressed in degrees, as stated previously, it is equal to approximately 52.2387° for the illustrated case of N=4. From FIG. 4 it will be observed that the active portion of the epitrochoid path involves a rotation of the input shaft 24 of 2 T or 104.4774°. Converted to the fractional part of an input revolution during which output motion occurs yields a value of 0.2902. Unfortunately, although the value of T is a function of N, T can not be increased by decreasing N below 4 because of the inability to provide an output disk 42 of a size and locate it relative to the epitrochoid path such that an active lobe of the path remains throughout its entire length within the boundary of the disk. Therefore, if an increased ratio or any of several other ratios not attainable by the embodiment of FIG. 1 of output to input is desired, resort may be had for even values of N to a modification such as that shown in FIGS. 5 and 6 to which attention should now be directed.

The input portion of the embodiment of FIGS. 5 and 6 is not shown because it is identical up to elements 32 and 38 as the structure shown in FIG. 1 commencing with input shaft 24. However, as seen in FIGS. 5 and 6, the output section consists of two arms, 60 and 61, mounted via respective hubs, 62 and 63, upon the ends of respective output shafts, 64 and 65, which in turn are journalled in hubs 66 and 67, supported by standard 68 mounted on base 21. Output gears, 69 and 70, are mounted on the free ends of the shafts 64 and 65 in mesh with a gear 71 mounted on an output shaft 72 which is journalled in a hub 73, also supported by standard 68. The gears 69 and 70 are identical in size and pitch. The relation is such that the arms 60 and 61 are rotated in identical phase and always point in the same direction relative to one another. They will be parallel in the position seen in FIG. 6, will be in line after rotating 90°, and will again be parallel but pointing in the opposite direction after rotating an additional 90°.

With this embodiment each of the arms 60 and 61 has a radial slot in its free end, respectively the slots 74 and 75. The output shafts 64 and 65 are supported for rotation about separate centers located 180° apart equidistant from the longitudinal axis of the input drive shaft 24 and midway between a corresponding two of the points of inflection of the epitrochoid path which two points of inflection mark the boundary of a contiguous sequence of concave section, inflection point, convex section, inflection point, and concave section of the epitrochoid path. Thus, for example, shaft 64 is located at point 40 represented in FIG. 4, while shaft 65 is located at point 76 represented in FIG. 4. In this way the cylindrical member 32, if moving in the direction of arrow 77 in FIG. 6, will engage and rotate arm 60 through 180° with arm 61 following because of the geared interconnection. There is a dwell related to the rotations of input shaft 24 of approximately 75.52° whereupon arm 61 is engaged and rotated through 180°, followed by another dwell of approximately 75.52°. Thereafter the cycle repeats. Of the four lobes or sections of the epitrochoid path, two active lobes or sections of the epitrochoid path, two active lobes or sections alternate with two inactive sections. The cylindrical member 32 engages alternately one or the other of the arms 60 and 61 to alternately rotate one or the other through 180°.

In the embodiment of FIGS. 5 and 6, the detent mechanism consists of a slide 80 mounted on two capped posts, 81 and 82, and provided with a central slot 83 into which projects finger 38. The slide 80 has at both ends a series of lateral projections or fingers 84, 85, 86 and 87, which can all be seen in FIG. 7. Projections 84 and 85 are shown in full detail in FIG. 12. The projections 86 and 87, although not shown in FIG. 12, are mirror images of 84 and 85. Also, apparent from FIG. 12 is the manner in which the fingers, here 84 and 85, engage the projecting ends of arms 60 and 61 preventing rotation in either direction.

It should be understood that FIG. 6 views the arms 60 and 61, and slide 80, in the direction of the arrows 6—6 in FIG. 5. FIGS. 7 to 12 view the parts in the opposite direction as seen from the plane designated by 8—8 in FIG. 5.

Reference should be had to FIGS. 7 to 11 for a better understand of the operation of the detent slide 80. Throughout the figures the arrows 90, 91 and 92 represent the movement, respectively, of arm 28, arm 34, and slide 80, at the instant shown in the drawing. As seen in FIG. 7, the cylindrical member 32 is rotating arm 60 clockwise. Arm 61 is being gear driven clockwise. Slide 80 is moving to the left, but finger 87 is still clear of the end of arm 61. In FIG. 8, arms 60 and 61 have reached the position shown, with cylindrical member 32 at an inflection point about to leave slot 74 in arm 60. At the same moment the slide 80 is just about to interfere with arms 60 and 61 through engagement by fingers 86 and 87.

In FIG. 9, interference between fingers 86 and 87 and arms 60 and 61 reaches a maximum with cylindrical member 32 at the 3 O'Clock position. As rotation of arm 28 continues, slide 80 moves back toward the right until, as seen in FIG. 10, the fingers 86 and 87 are about to release arms 60 and 61, and cylindrical member 32 is about to enter slot 75 in arm 61. Whereupon, arm 61 is rotated with arm 60 clearing finger 86 of slide 80. The remaining progression should now be obvious.

For the embodiment just described with reference to FIGS. 5 to 12, the fractional part of an input revolution of shaft 24 during which output motion of shaft 72 occurs is equal to 0.5804. The gears 69 and 70 will both rotate 180° at spaced intervals with output shaft 72 rotating through an angle dependant upon the gear ratio of gear 71 relative to gears 69 and 70.

Referring now to FIGS. 13 and 14, there is shown a modification of the embodiment of FIG. 1 which is not limited to even values of N and which also provides output motion of its output shaft during the fractional part of an input revolution output shaft during the fractional part of an input revolution equal to 0.5805 for N=4. For other values of N, obviously the output motion ratio will generally be different. There is illustrated in FIGS. 13 and 14 only that portion of the drive assembly that differs from the structure shown in FIG. 1.

As seen in FIG. 13, an arm 100 is joined to the end of drive shaft 24 for driven rotation with shaft 24. Arm 100 extends radially from shaft 24 in two directions 180° apart. Arm 100 can be thought of as representing the integration with the structure of FIG. 1 of a second radially extending arm with a second planetary gear and second cylindrical member all mounted in polar symmetry to the corresponding components of FIG. 1 for rotation around the drive shaft, 24, longitudinal axis at diametrically opposite locations. Therefore, rather than duplicate the explanation, the same reference numerals as used in FIG. 1 are used in FIG. 13 to designate one set of components while the second set is designated by the numbers increased by 100.

The output disc 142 is mounted on shaft 40 and differs from disc 42 of FIG. 1 only with respect to the skirt portions 200 and 201 containing detent notches 202 and 203. The radial slots 45 and 46, only one of which is shown in FIG. 13, are located and dimensioned the same as in FIG. 1.

The detent mechanism in the embodiment of FIGS. 13 and 14 has a latch 150 similar in all respects to latch 50 in FIG. 1 except for the upper portion which enters one or the other of the notches 202 and 203. Only the portion that differs will be described here. It includes a step or edge 204 surmounting the surface 205 of latch 150 and a finger 206 spaced above step 204 at the top of an extension 207. In its lowermost position, latch 150 positions finger 206 in notch 203, see FIG. 13, while in the uppermost position of latch 150, the step 204 is positioned in notch 202, see FIG. 14.

The operation of this embodiment should now be obvious. Each cylindrical member 32 and 132 will alternately enter one of the slots 45 and 46 driving the disc 142 through successive rotations each of 180°. For clockwise rotation of arm 100 as seen in FIG. 13, the cylindrical member 32 will always engage slot 46 while the cylindrical member 132 will always engage slot 45. If the remaining structure is the same as in FIG. 1, the output shaft 40 will rotate 180° twice for each revolution of input shaft 24 in essentially the same relationship as occurs with the embodiment of FIG. 5.

Having described the present invention with reference to the presently preferred embodiments, it should be understood by those skilled in the subject art that various changes in construction can be introduced without departing from the true spirit of the invention as defined in the appended claims.

What is claimed is:

1. An intermittent motion drive assembly for converting continuous constant velocity rotary motion of an input drive member to intermittent rotary output motion of an output member where said output motion is free of first and second derivative discontinuities for constant velocity of said input drive member, said drive assembly comprising in combination an input drive shaft having a longitudinal axis, a stationary sun gear having a first pitch diameter and mounted concentric with said drive shaft axis, at least one planetary gear having a second pitch diameter, the ratio of said first to second pitch diameters being equal to N where N is a whole number greater than three, a radially extending arm joined to said input drive shaft for driven rotation therewith, said planetary gear being rotatably mounted on said arm about a central axis located at a radial distance a from said drive shaft axis and with the teeth of said planetary gear in toothed engagement with said sun gear for rotation thereabout, a cylindrical member coupled in driven relation to said planetary gear with the longitudinal axis of said cylindrical member disposed parallel to said drive shaft axis and offset by a radial distance b from the axis of rotation of said planetary gear, said axis of said cylindrical member traversing an epitrochoid path of N lobes centered about said drive shaft axis as said cylindrical member is driven by said planetary gear as the latter is driven about said sun gear, said epitrochoid path having alternating convex and concave sections joined by points of inflection, an output member, means operatively coupled to said output member for driving said output member, said means having two body portions each supported for rotation about a center located midway between along a straight line joining two of said points of inflection which two points of inflection mark the boundary of a contiguous sequence of concave section, inflection point, convex section, inflection point, and concave section of said epitrochoid path, each of said body portions having a radial slot open at its radially outward end and disposed at a distance from the center of the rotation of the corresponding body portion such as to be engageable by said cylindrical member for rotating said body portion and thereby said output member during the travel of said cylindrical member between said two inflection points which mark the boundaries of said contiguous sequence of sections, the relationship between said N, a and b parameters being defined by the equations $$\tan T = \frac{\tan((N + 1)T)}{N + 1} \text{ and} \tag{1}$$

$$\frac{b}{a} = \frac{-\sin T}{(N + 1)\sin((N + 1)T)}, \text{ and} \tag{2}$$

a detent means is coupled in driven relation to said input drive member for securing said body portions against rotation during the intervals in which said cylindrical member is out of engagement with a body portion.

2. An intermittent motion drive assembly according to claim 1, wherein said two body portions are joined integrally about a common center of rotation with said respective radial slots located 180° apart.

3. An intermittent motion drive assembly according to claim 2, wherein a second radially extending arm with a second planetary gear and second cylindrical member are all mounted in polar symmetry to the corresponding first components for rotation around said drive shaft longitudinal axis at diametrically opposite locations whereby said first and second cylindrical members engage alternately one or the other of said body portions to alternately rotate one or the other of said body portions through 180°.

4. An intermittent motion drive assembly according to claim 1, wherein the value of N is even, and said two body portions each comprise an arm having the corresponding radial slot in one end and having its opposite end mounted on a respective output shaft, said output shafts being supported for rotation about separate centers located 180° apart equidistant from said longitudinal axis of the input drive shaft and midway between a corresponding two of said points of inflection which two points of inflection mark the boundary of a contiguous sequence of concave section, inflection point, convex section, inflection point, and concave section of said epitrochoid path, and means coupling said output shafts to said output member such that said body portion arms are constrained for simultaneous rotation in identical phase, whereby said cylindrical member engages alternately one or the other of said body portions to alternately rotate one or the other of said body portions through 180°.

* * * * *